US012599523B2

(12) United States Patent
Sweeney et al.

(10) Patent No.: US 12,599,523 B2
(45) Date of Patent: Apr. 14, 2026

(54) PATIENT SUPPORT APPARATUS WITH BARRIER

(71) Applicant: Stryker Corporation, Kalamazoo, MI (US)

(72) Inventors: Christopher Ryan Sweeney, Portage, MI (US); Matthew A. Cutler, Portage, MI (US)

(73) Assignee: Stryker Corporation, Portage, MI (US)

( * ) Notice: Subject to any disclaimer, the term of this patent is extended or adjusted under 35 U.S.C. 154(b) by 82 days.

(21) Appl. No.: 18/209,864

(22) Filed: Jun. 14, 2023

(65) Prior Publication Data

US 2023/0414424 A1 Dec. 28, 2023

Related U.S. Application Data

(60) Provisional application No. 63/356,695, filed on Jun. 29, 2022, provisional application No. 63/356,083, filed on Jun. 28, 2022.

(51) Int. Cl.
*A61G 7/05* (2006.01)

(52) U.S. Cl.
CPC .................................. *A61G 7/0524* (2016.11)

(58) Field of Classification Search
CPC .............. A61G 7/0524; A61G 2203/30; A61G 7/0506; A61G 7/0509; A61G 7/0521; A61G 7/005; A61G 7/0507
USPC .............................................................. 5/663
See application file for complete search history.

(56) References Cited

U.S. PATENT DOCUMENTS

| | | | | |
|---|---|---|---|---|
| 5,097,550 | A * | 3/1992 | Marra, Jr. | A61G 7/0524 5/663 |
| 5,276,432 | A | 1/1994 | Travis | |
| 5,325,551 | A | 7/1994 | Tappel et al. | |
| 5,542,136 | A | 8/1996 | Tappel | |
| 6,820,293 | B2 * | 11/2004 | Alverson | A61G 7/0507 5/663 |
| 7,406,736 | B2 | 8/2008 | Flick | |
| 7,690,059 | B2 | 4/2010 | Lemire et al. | |
| 7,784,125 | B2 | 8/2010 | Morin et al. | |
| 7,861,334 | B2 | 1/2011 | Lemire et al. | |
| 8,393,026 | B2 | 3/2013 | Dionne et al. | |
| 8,910,334 | B2 | 12/2014 | Lafleche et al. | |

(Continued)

FOREIGN PATENT DOCUMENTS

WO 2023/278478 A1 1/2023

OTHER PUBLICATIONS

Stryker, MedSurg Bed, Model 3002 S3, Patriot Series, Maintenance Manual, 2006-009-102 REV C, Oct. 2008, pp. 1-227.

(Continued)

*Primary Examiner* — Justin C Mikowski
*Assistant Examiner* — George Samuel Gines
(74) *Attorney, Agent, or Firm* — Warner Norcross + Judd LLP

(57) ABSTRACT

A patient support apparatus is provided including a deck for supporting a mattress thereon and a barrier mounted relative to the deck. The barrier has a barrier body, with opposed first and second outer sides, a barrier outer perimeter, and a through opening extending there through from the first outer side to the second outer side. The patient support apparatus may include a cover for covering the through opening and which is mounted at the barrier body.

18 Claims, 9 Drawing Sheets

(56) References Cited

U.S. PATENT DOCUMENTS

| | | | | |
|---|---|---|---|---|
| 8,911,387 | B2 | 12/2014 | Lafleche et al. | |
| 9,079,685 | B2 | 7/2015 | Sudakoff | |
| 9,468,307 | B2 | 10/2016 | Lafleche et al. | |
| 9,820,904 | B2 | 11/2017 | Lafleche et al. | |
| 10,130,536 | B2 | 11/2018 | Roussy et al. | |
| 10,537,185 | B2 | 1/2020 | Creekmuir et al. | |
| 10,791,966 | B2 | 10/2020 | Becker et al. | |
| 10,905,609 | B2 | 2/2021 | Childs et al. | |
| 10,980,689 | B2 | 4/2021 | Bhimavarapu et al. | |
| 11,033,233 | B2 | 6/2021 | Hayes et al. | |
| 11,160,514 | B2 | 11/2021 | Nahavandi et al. | |
| 2005/0172405 | A1* | 8/2005 | Menkedick | A61G 7/0509 5/713 |
| 2007/0130692 | A1* | 6/2007 | Lemire | A61G 7/018 5/618 |
| 2007/0163045 | A1 | 7/2007 | Becker et al. | |
| 2007/0180616 | A1* | 8/2007 | Newkirk | A61G 7/0524 5/658 |
| 2010/0229304 | A1* | 9/2010 | Heimbrock | A61G 7/0514 5/503.1 |
| 2016/0058640 | A1* | 3/2016 | Morin | A61G 7/0507 5/430 |
| 2017/0181909 | A1* | 6/2017 | Baker, Jr. | A61G 7/0522 |
| 2021/0052197 | A1 | 2/2021 | Sukumaran et al. | |
| 2024/0342029 | A1 | 10/2024 | Childs et al. | |

OTHER PUBLICATIONS

Umano Medical Inc., "User Manual Jul. 2018 200-0-11-EMG R1", pp. 1-77, (2018).

Picture of Umano Ook Snow Bed, downloaded Feb. 17, 2022.

* cited by examiner

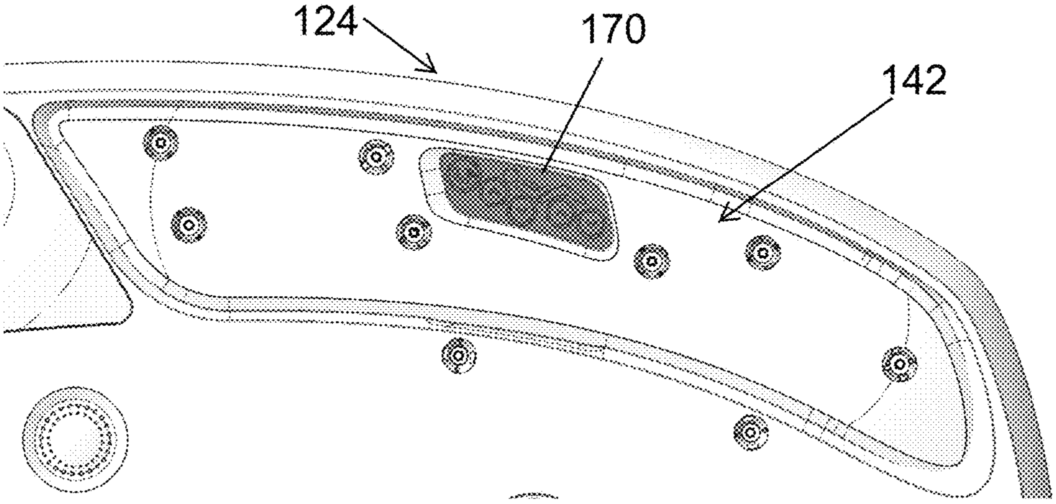
FIG. 8
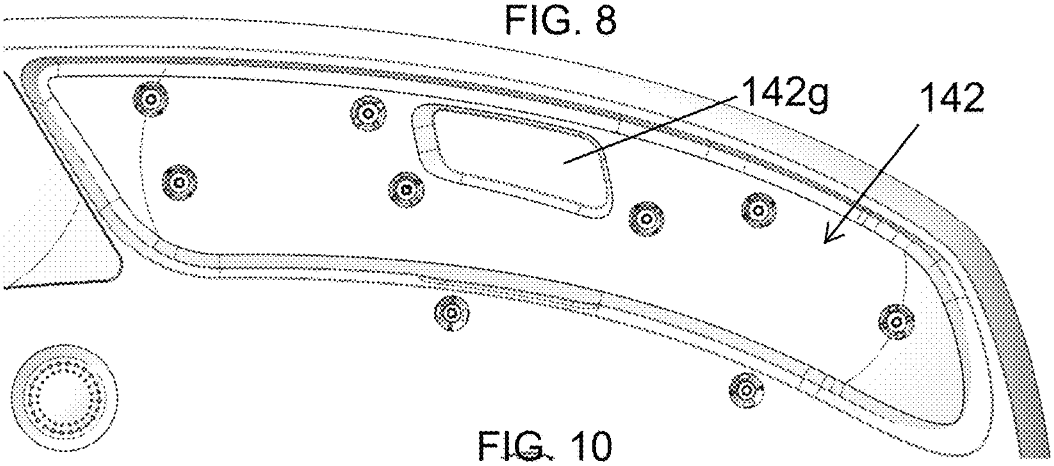
FIG. 10
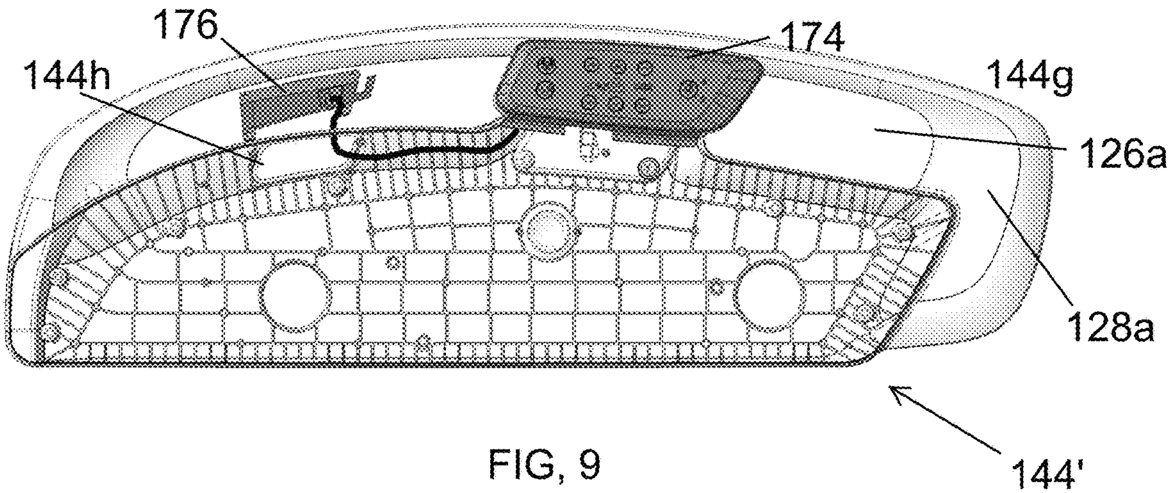
FIG, 9

PATIENT SUPPORT APPARATUS WITH BARRIER

BACKGROUND

The present disclosure relates to patient support apparatuses, such as beds, cots, stretchers, recliners, or the like. More specifically, the present disclosure relates to patient support apparatuses that include a barrier, such as a side rail, headboard, or footboard.

Existing patient support apparatuses, such as hospital beds, cots, and/or stretchers, often include a barrier, such as side rail, headboard, and/or footboard. These barriers often include through openings to form handhold or handgrips and also allow the patient to be visible through the barrier. However, in behavioral health settings or pediatric settings, for example, these through openings can raise the ligature risk.

Accordingly, there is a need for a way to fill or close these openings without taking away the functionality of these openings.

SUMMARY

In one form, a patient support apparatus includes a deck for supporting a mattress thereon and a barrier mounted relative to the deck. The barrier has a barrier body, with opposed first and second outer sides, a barrier outer perimeter, and a through opening extending there through from the first outer side to the second outer side. The patient support apparatus further includes a cover for covering the through opening and which is mounted at the barrier body. The cover includes a first panel and a second panel. The first panel includes an outer surface forming a patient facing surface and a first panel outer perimeter. The second panel includes a second panel outer perimeter and an outer surface forming an outwardly facing surface of the barrier when mounted to the barrier body. The first and second panels are joined together by a fastener that does not engage the barrier body.

For example, the first and second panels may be joined together by a fastener inward of the first and second panel outer perimeters wherein the fastener does not engage the barrier body.

In any of the above, the patient facing surface of the first panel comprises an imperforate surface.

In any of the above, the fastener comprises a threaded fastener or a snap fit coupler.

In any of the above, the second panel includes a recess in the outwardly facing surface to form a handhold.

In any of the above, the second panel includes a recess or an opening to support an electronic device therein.

In a further aspect, the patient support apparatus further includes an electronic device supported in the recess or opening of the second panel.

In any of the above, the patient support apparatus according to any above claim, wherein at least a portion of each of the first and second panels is transparent.

In any of the above, the patient support apparatus further includes a light source directing light into at least one of the panels.

In any of the above, the first panel comprises a monolithic panel.

In a further aspect, the first panel cover includes a flexible lip molded with the monolithic panel for engaging the barrier body adjacent the through opening.

In other forms, the first and second panels each may include a flexible lip at each of their respective first and second outer perimeters for engaging opposed sides of the barrier body adjacent the through opening. For example, the flexible lip may be mounted to the panels.

In any of the above, the first and second sides of the barrier body each includes a recess, with the through opening being located in the recesses.

In any of the above, at least one panel of the first and second panels is mounted to the barrier body in one of the recesses over the through opening, wherein the one panel is recessed in the barrier body.

In another aspect, the first and second sides of the barrier body form an outer surface of the barrier, and at least one panel of the first and second panels is flush mounted to the barrier body wherein the outer surface of the one panel is flush with the outer surface of the barrier body.

In yet another aspect, the first and second sides of the barrier body form an outer surface of the barrier, and at least one panel of the first and second panels is mounted on the outer surface so that it overlays the outer surface of the barrier body.

In any of the above, the first and second panels are releasably mounted to the barrier body wherein the first and second panels are removable.

In any of the above, the barrier body includes a second through opening, and at least one of the first and second panels covering both through openings.

In any of the above, the barrier comprises a side rail.

Before the various embodiments disclosed herein are explained in detail, it is to be understood that the claims are not to be limited to the details of operation or to the details of construction and the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

BRIEF DESCRIPTION OF THE DRAWINGS

FIG. 8 is an enlarged perspective view of the side rail of FIG. 5 with an electronic device mounted in the side rail;

FIG. 9 is an inside exploded perspective view of the side rail of FIG. 8;

FIG. 10 is a similar view to FIG. 8 but with the electronic device removed and a blank inserted in place of the electronic device;

DETAILED DESCRIPTION

Figure 1:
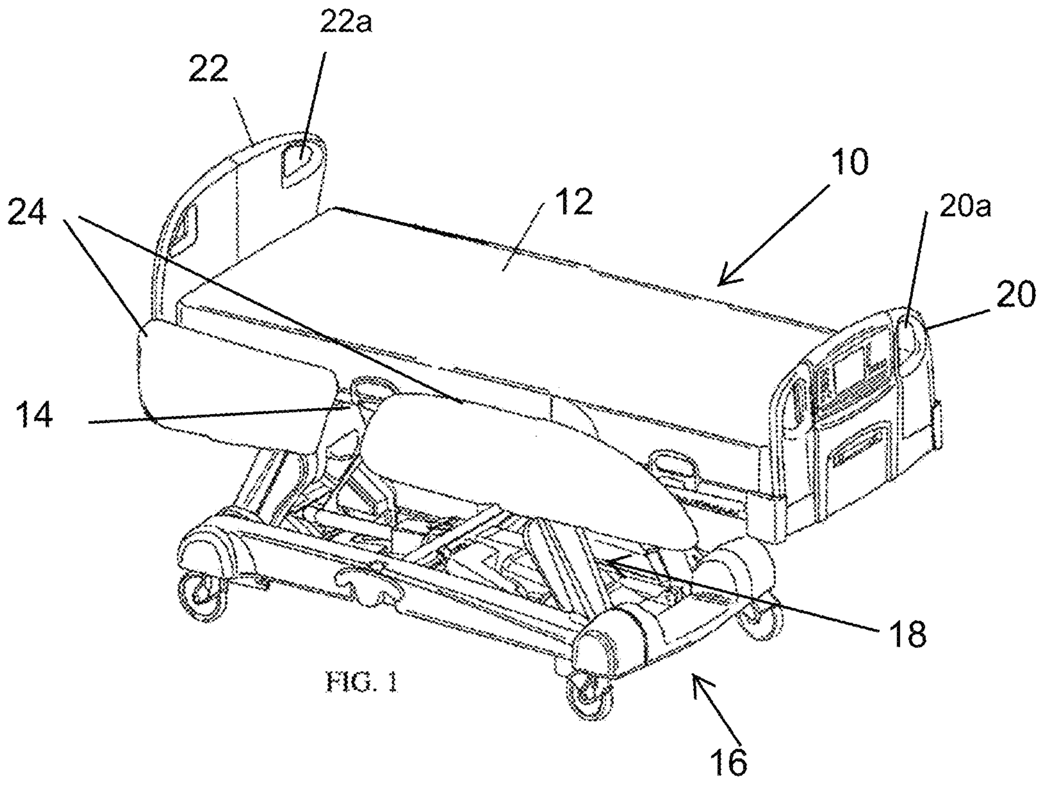
FIG. 1 is a perspective view of a patient support apparatus according to one embodiment of the disclosure.

Referring to FIG. 1, the numeral 10 generally designates a patient support apparatus. Although the particular form of patient support apparatus 10 illustrated in FIG. 1 is a bed adapted for use in a hospital or other medical setting, it will be understood that patient support apparatus 10 may be a cot, a stretcher, a gurney, a recliner, a residential bed, or any other structure capable of supporting a patient, whether stationary or mobile and/or whether used in a medical or residential setting.

In general, patient support apparatus 10 includes a mattress 12 that is supported on a litter deck 14, which in turn is supported on a litter frame (not shown). Litter deck 14 may have one or more articulatable deck sections, including a back deck section ("Fowler"), a seat deck section, and a thigh deck section, which together with the litter frame are supported on a wheeled base 16 by a lift assembly 18. Patient support apparatus 10 further includes a footboard a headboard 22, and a plurality of side rails 24, including head end side rails and foot end side rails. Side rails 24 are all shown in a lowered position in which ingress into, and egress out of, patient support apparatus 10 is not obstructed by the lowered side rails 24. Each side rail is configured so it can be individually moved to a raised position, as well as to one or more intermediate positions.

Lift assembly 18 is adapted to raise and lower the litter frame and litter deck 14 with respect to base 16 and may incorporate actuators, such as electric actuators, hydraulic actuators, pneumatic actuators, or any other suitable device for extending the lift assembly 18 for raising and lowering the litter frame and litter deck 14. The actuators may be operated independently so that the litter frame and litter deck may be tilted (with respect to base 16), such as in a Trendelenburg orientation or in a reverse Trendelenburg orientation. The patient support apparatus 10 may also incorporate actuators, such as electric actuators, hydraulic actuators, pneumatic actuators, or any other suitable device, for moving the individual deck sections. The head deck section, which as noted may be referred to as the Fowler, is pivotable about a generally horizontal pivot axis between a generally horizontal orientation (shown in FIG. 1) and a plurality of raised positions (not shown). The thigh deck section (and optional foot deck section) may also be pivotable about generally horizontal pivot axes.

In some embodiments, patient support apparatus 10 may be modified from what is shown to include one or more components adapted to allow the user to extend the width of patient support deck 14, thereby allowing patient support apparatus 10 to accommodate patients of varying sizes. For example, the width of deck 14 may be adjusted, between a first width, a second or intermediate width, and a third or expanded width. The first width may be, for example, a 36 inch width, the second intermediate width may be, for example a 42 inch width, and the third expanded width may be, for example, a 48 inch width, although these widths may be varied.

Mattress 12 may comprise a variety of different mattresses with a variety of different cushioning components, such as foam, foam in combination with bladders, foam in combination with one or more gel layers, or foam in combination with bladders and one or more gel layers, and may include a mattress control system incorporated into the mattress and contained, for example, within the foot end of the mattress in a mattress control housing, such as disclosed in U.S. Pat. Nos. 5,542,136; 5,325,551; 8,910,334; 8,911,387; 7,406,736; 9,820,904, and 9,468,307, which are commonly owned by Stryker Corporation of Kalamazoo, Michigan, and are incorporated by referenced in their entireties herein.

As noted above, patient support apparatus 10 may include one or more barriers, such as footboard 20, headboard 22, and rails 24. Each of the barriers includes a barrier body with one or more through openings, such as openings 20*a*, 22*a*, and 26*a*, which may be used to provide handholds at the respective barrier. In order to remove these through openings as potential sites for ligatures, for example, when patient support apparatus 10 is to be used in a behavioral health or pediatric setting, one or more of the barriers may include one or more covers (such as covers 40, 140) to fill the respective through openings. For ease of illustration, only the covers in the side rails are illustrated; however should be understood that the illustrations and accompanying description may also apply to the other barriers, including the footboard and headboard through openings.

Figure 2:
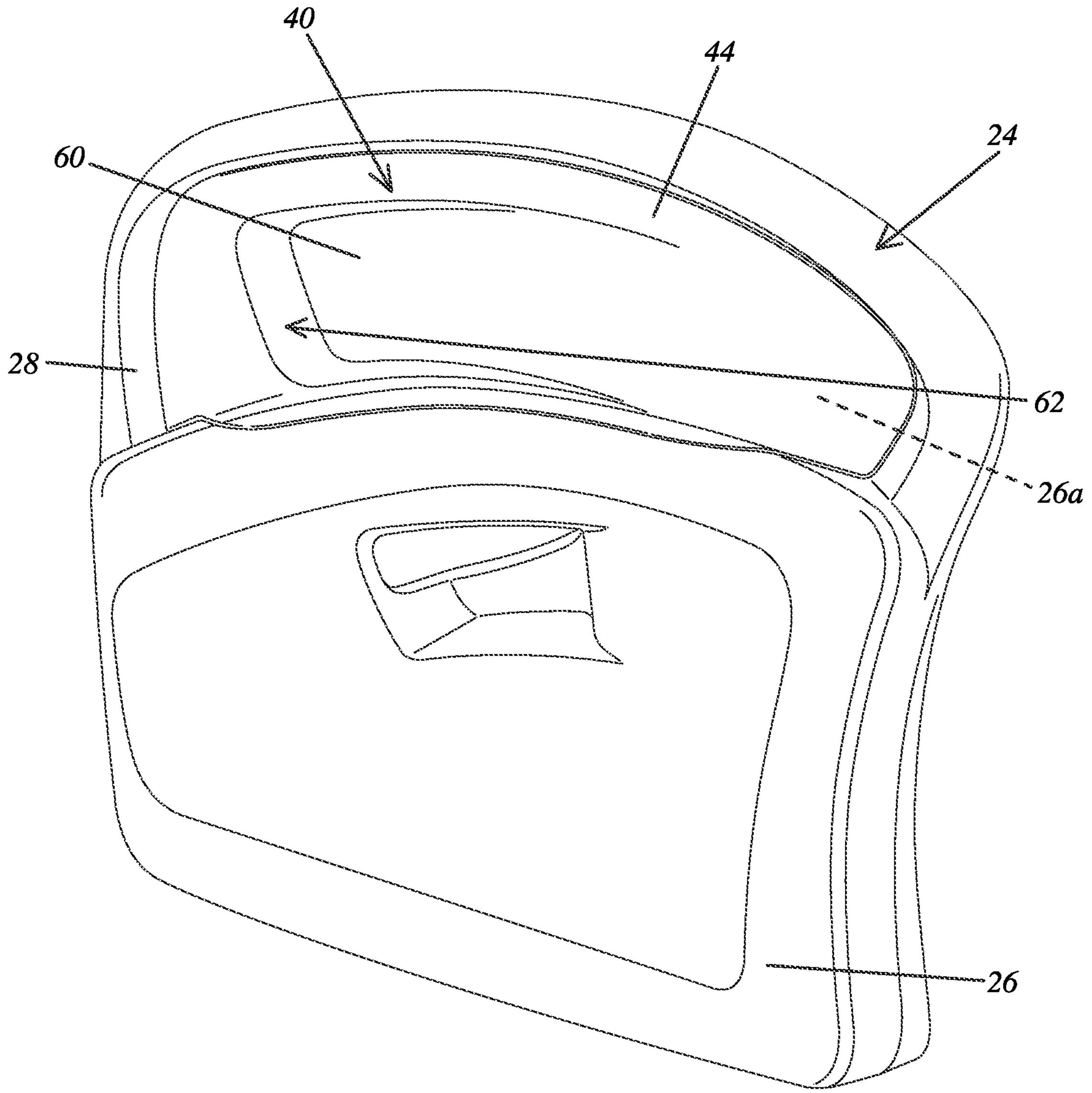
FIG. 2 is an enlarged perspective view of a side patient support apparatus barrier in the form of a side rail with a cover filling a through opening of the side rail.

Referring to FIG. 2, in the illustrated embodiment, side rail 24 includes a side rail body 26 with one or more through openings 26*a*. The size and shape of the side rail body and size, shape, and number of through openings may vary. Further, the location of the through openings may vary. While all the through openings illustrated herein (e.g. see FIGS. 1-12) are within the outer perimeter of the barrier and surrounded by portions of the barrier body, and hence are "closed openings", they may extend through to the outer perimeter of the barrier body so that they are not fully enclosed by the barrier body.

As noted, in order to cover and close one or more of these through openings, the barriers include one or more covers 40, 140. As best seen or understood from FIGS. 3-4, cover 40 is formed from two or more panels 42, 44 that are mounted to the barrier body, in this case side rail body 26, so that they are connected to each other and in effect sandwich the side rail body there between without being adhered to or fastened to the side rail body. Optionally, as will be more fully described below, the panels may be removable so that the side rail body can be used with any damage caused by mounting or removing the side rail body. In this manner, the side rail body may be restored to its previous condition for use as a side rail in a normal setting.

Figure 3:
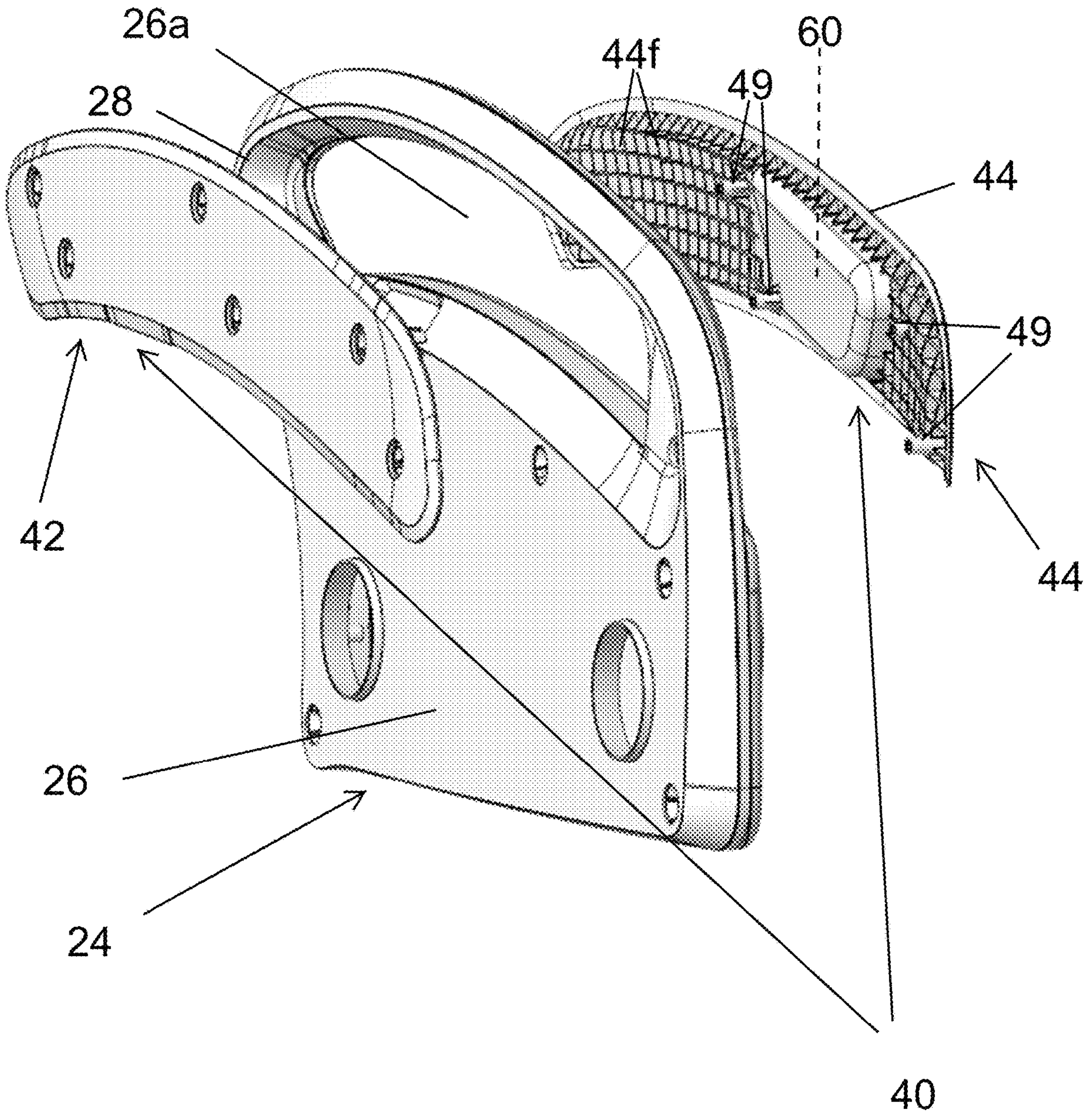
FIG. 3 is an exploded perspective view of the side rail of FIG. 2.

Referring again to FIGS. 3-4, each panel is sized to cover the respective through opening. As best seen in FIGS. 2 and 3, side rail body 26 includes a recess 28 on each opposed outer side of the side rail body with the through opening 26*a* located in the respective recesses extending there through from a first outer side to a second outer side of the side rail body for forming a handhold. However, when the panels 42, 44 are mounted to the side rail body 26 they are sized to cover and close the opening and cover and close the recess. Though as will be more fully described in reference to FIG. 7, one or both panels may leave a portion of the recess uncovered, for example, when the recess is significantly larger than the through opening.

Figure 4:
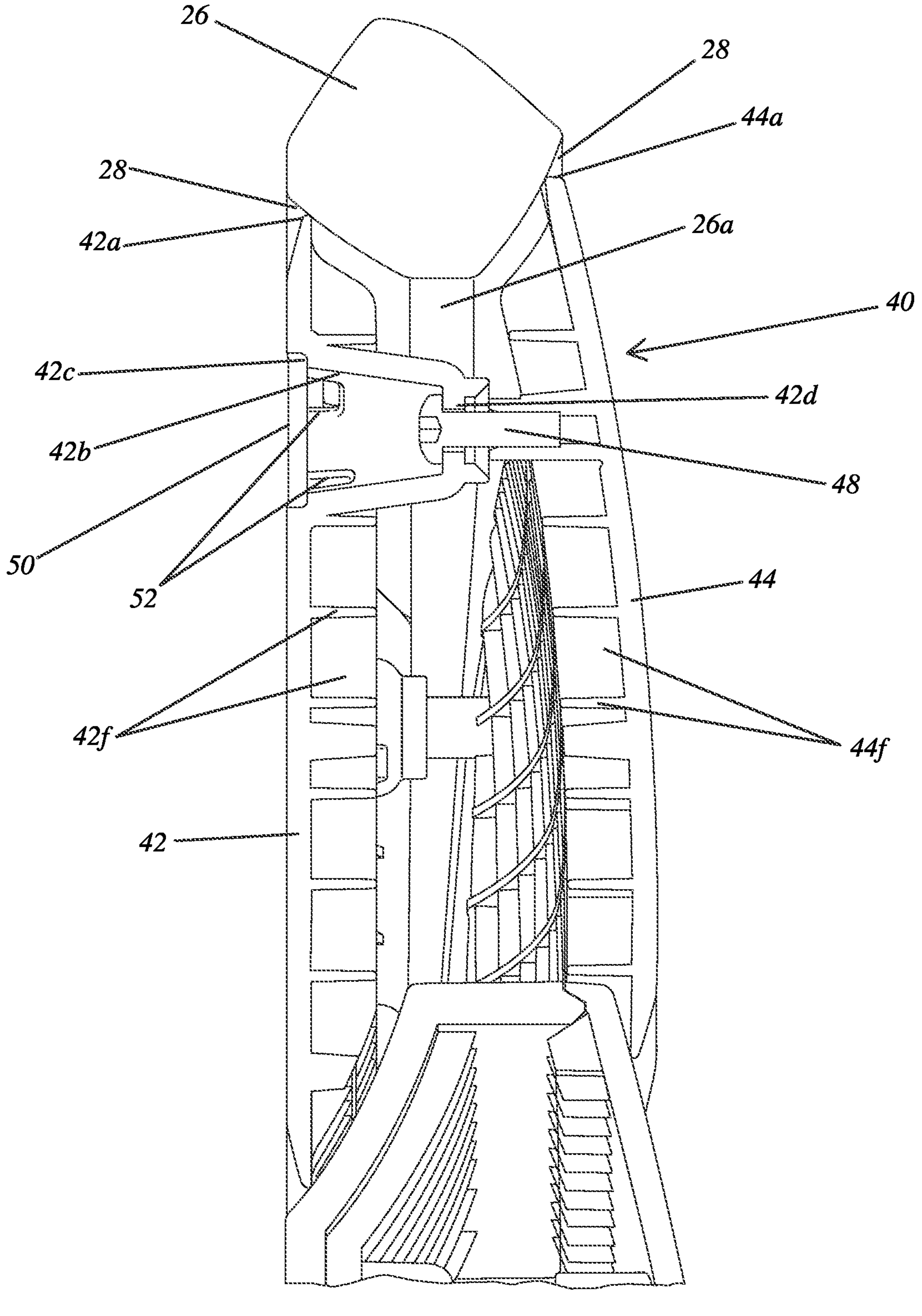
FIG. 4 is an enlarged cross-section view of the side rail of FIG. 2.

In one embodiment, as best seen in FIG. 4, the outer perimeter 42*a*, 44*a* of each panel is sized so that when mounted, the outer perimeter of the respective panel may rest on the side rail body in the respective recess so that it is recessed below the outer side surface of the respective outer side of the side rail body. Alternately, the perimeters of the panel may rest on the side rail body adjacent or at the recess perimeter. Optionally, the entire outer surface of the respective panel may be planar up to its respective outer perimeter so that the whole panel is recessed, flush, or overlay the side rail body. Optionally, the outer perimeter of the panel may be formed from a lip that its sloped inwardly, such as viewed in FIG. 4, so that while the outer perimeter is recessed or flush, the balance (or remainder) of the panel can be flush or project outwardly from the side rail body.

Further, as will be more fully described below, the lip may be configured to be flexible to better follow the surface topology of the landing area (e.g. contact line) on the respective recess.

Therefore, each panel may be generally recessed in, flush with, or overlay the outer sides of the side rail body. Optionally, the panels may be configured to generally follow the exterior surface topology of the opposed sides of the side rail body so they appear more integrated with the side rail body. Further, the material may be the same as the side rail body material so that only the seam indicates it is a separate component or the material may be different, as described below.

Figure 12:
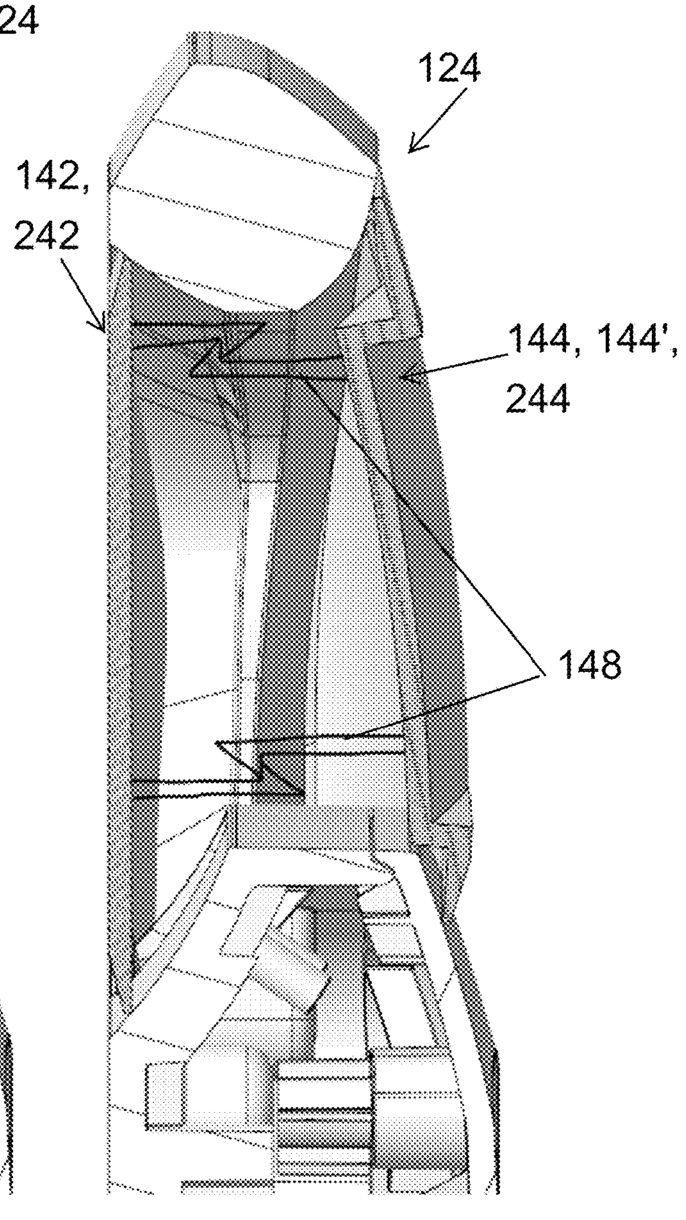
FIG. 12 is an enlarged cross-section view of the side rail of FIG. 8 illustrating another embodiment of the details of the side rail cover mounting arrangement.

As noted above, the two panels may be located on opposed outer sides of the barrier body and joined together by a fastener wherein the fastener does not engage the barrier body. For example, referring again to FIG. 4, panels 42 and 44 may be joined by one or more fasteners 48 that are located inward of the outer perimeters of the two panels. Further, fasteners 48 do not extend through the opposing panel 44 and instead engage structures formed on the inside surface of panel 44. For example, in the illustrated embodiment, fasteners 48 comprise threaded fasteners that engage threaded posts 49 formed on the inside surface of panel 44. As will be described below, the fasteners may comprise snap fit couplers, including cantilever type couplers, such as shown in FIG. 12, or a combination of threaded fasteners and snap fit couplers may be used.

Alternately, the respective panels 42, 44 may be mounted an adhesive, which can be located at the respective perimeters of the panels so that they attach to the side rail body around the through opening, though in other embodiments they may be joined together by an adhesive located inward of their outer perimeters instead of mounted them to the side rail body.

Optionally, fasteners 48 are located in recesses 42*b*, such as circular recesses, that are formed in panel 42 and which extend into the outwardly facing side of panel 42. Optionally, recesses 42*b* may be covered by plugs 50, which are sized to fill the opening at the mouth of the recess and, optionally, seal the recess. For example, plugs 50 may be each formed, such as by molding, with a lip or provided with O-ring seal at their outer perimeter or provided with a gasket seal that is sandwiched between the cover and, for example, shoulder 42*c*.

Optionally, recess 42*b* may have a stepped profile with a shoulder 42*c*, such as a continuous circular shoulder, on which plug 50 may be seated and optionally sealed. Further, plug 50 may be sized so that it is flush with the outer exterior surface of the side rail body.

To secure plugs 50 in recesses 42*b*, plugs 50 may be formed with snap fit couplers 52 that releasably and frictionally engage the inside wall of the recess. Optionally, the inside wall of the recess may have projecting rings or recesses for mechanical engagement by the snap fit couplers 52. To seal the respective plugs, the side rail may include a membrane over the patient facing side, which also facilitates cleaning, such as disclosed in U.S. Pat. No. 7,861,334 commonly owned by Stryker Corporation of Kalamazoo, Michigan, and which is incorporated by referenced in its entirety herein.

As noted, to seal the recess, each plug 50, which has a generally disc shaped construction, may include a flexible lip to frictionally engage the inside wall of recess 42*b* adjacent shoulder 42*c* or may include a gasket located between the cover and the shoulder.

Other locating structures may also be used. For example, in addition to having one or more fasteners, panels 42, 44 may be formed with guides, such as one or more pins that extend from panel 42 into receptacles formed in posts on the inwardly side of panel 44 (or vice versa) and optionally frictional engage the posts to provide added support to the panels. Further, the pins and posts may be configured to engage each other ahead of the fasteners to assist in aligning the panels so that the fasteners are aligned with the appropriate threaded posts. Alternately or in addition, magnets, including electromagnets, may be used to couple to two panels together.

As best seen in FIGS. 2-4, each panel 42, 44 may have a smooth outer surface. Optionally, panel 44 may be formed with a recess 60 that is sized to form a handhold 62 (FIG. 2). For example, the recess 60 may be a tapered C recess so that a caregiver can have a generally horizontal gripping surface and a vertical griping surface to hold onto. In this manner, when the handhold provided by the through opening is no longer available, the cover 40 can provide one or more gripping surfaces and hence form a handhold for the caregiver to replace the now inaccessible handhold.

In addition, the outer surface 42*e* may be continuous except for recesses 42*b*. Once recesses 42*b* are filled with plugs 50, outer surface 42*e* of panel will be free of any unfilled openings, in other words imperforate.

Optionally the inwardly facing sides of panels 42, 44 may be reinforced by webs 42*f*, 44*f* that are formed on the inside surfaces of panels 42, 44, which may be arranged in a grid pattern. Further, the webs may taper closer to the outer perimeters of the panels to allow the outer perimeters to be more flexible. Thus, the panels may be formed as monolithic panels (formed from one piece) though panel 42 may have inserts in the form of plugs 50. However, the panels may also be formed from two or more sub-panels that are joined together during forming or during a preassembly process.

Additionally or alternately, the outer perimeter of one or both panels 42, 44 may have a lip formed thereon, such as by molding, which is formed from a thinner cross-section of the same material forming the panels or from a softer material, such as a softer plastic, such as rubber or elastomer, such as thermoplastic elastomer (TPE) or a thermoplastic vulcanizate (TPV), so that the outer perimeter may better follow the surface topography of recesses 28, and optionally seal the panel against the side rail body. Thus, one section of the panels, such as the middle of the panels, may be stiffer than another section or sections of the panels, such as their outer perimeters.

Accordingly, panels 42, 44 may be made from one material, such as molding, stamping or the like, or may be formed from two or more materials, such as insert molding, two shot molding, or the like.

In addition, a gasket may be located between the panels and the side rail body.

Optionally, the posts described herein may be formed by extensions of the webs or formed between the webs, for example, during the molding or forming process of the panels. For example, panels 42, 44 may be molded from a wide variety of plastics, such as polypropylene, TPO (thermoplastic polyolefin), including reinforced plastic, or may be composite panels formed from metal and plastic or metal that is coated with a film or the like, at least on their outwardly facing surfaces.

In addition, to provide at least some visibility of the patients supported on the patient support apparatus 10, a portion of or the entire panel may be formed from a transparent or opaque material. Optionally, when formed entirely from a transparent material, portions of the panels may be masked with a film or coating to hide features behind the respective panels.

As would be understood, to secure the two panels together, the first panel, such as panel 44 is positioned on one side of the side rail body and located in the recess 28 (on that side), and the second panel, such as panel 42, is then positioned on the opposed side of the side rail body and located in the recess (on that side). The fastener or fasteners are then inserted into the recess or respective recesses on panel 42 and then manipulated (e.g. by screwing or pressing) to engage the inward facing surface of the panel 44. For example, as shown in FIG. 4, as noted, fastener 48 may comprise a threaded fastener which is then screwed into the engagement structure on the inwardly facing surface of panel 44 to secure the two panels together.

As will be more fully described below, in any of the above panels, the panel may include a recess or an opening to support one or more electronic devices therein. Optionally, lights may also be incorporated to direct light into the panel. In this manner the panel may be used as part of an alerting system about the patient support configuration and/or a patient condition.

Further or in another aspect, as will be described in reference to FIGS. 5-12, the barrier body may include more than one through opening, with a cover of the type described above, for each through opening. Alternately, one or more of the covers may extend over and close two or more openings.

Referring again to FIGS. 5 and 7, in the illustrated embodiment, side rail 24 comprises a foot end side rail 124 with a side rail body 126 that includes two through openings 126*a* and 126*b* and a cover 140 and 240 for each through opening. Each cover 140, 240 is similarly formed from two panels 142, 144 and 242, 244, respectively. For general details of their construction and mounting of panels 142, 144 and 242, 244, reference is made above to panels 42, 44 and also to FIGS. 11 and 12, discussed below.

Figure 6:
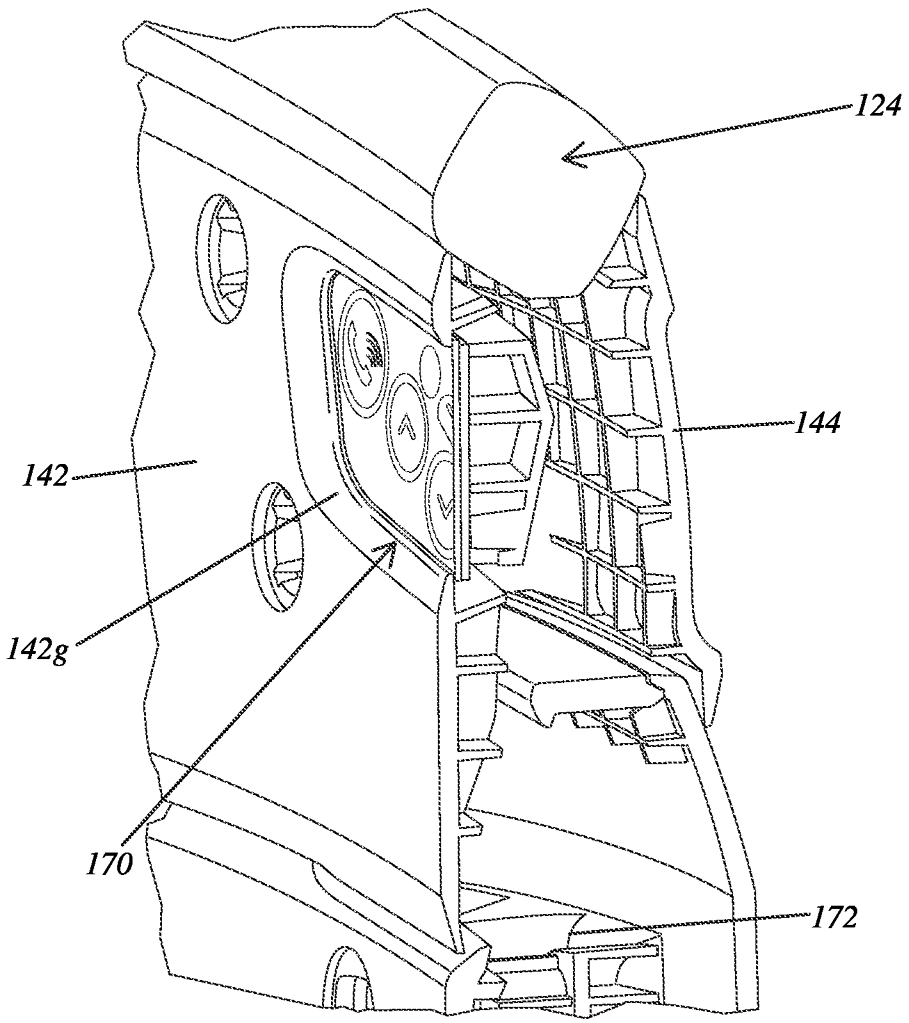
FIG. 6 is an enlarged cross-section view of the side rail of FIG. 5.

In the illustrated embodiment, and as best seen in FIGS. 6, 8 and 9, panel 142 is formed with an opening 142 *g* for mounting an electronic device 170 therein. For example, the electronic device may comprise a patient control, a camera, a microphone, a charging device for a phone, or other hand held electronic devices, or a speaker, or a combination of any of the above devices or other devices. Examples of suitable electronic devices that may be incorporated into panel 142 are described in U.S. Pat. Nos. 7,784,125, 8,393,026, 10,905,609, 10,791,966, and PCT Application Ser. No. PCT/US22/35359, filed on Jun. 28, 2022, which are commonly owned by Stryker Corp. of Kalamazoo, MI and which are incorporated by reference in their entireties herein. Cabling 170 *a* to provide power and provide signals to and from electronic device 170 may be extended from the patient support apparatus control system (such as described in any of the above referenced patents) into the side rail and passed through an opening 172 provided in side rail body 126 and between panels 142, 144 to connect the electronic device 170. Optionally the opening 142 *g* in panel 142 may be filled with a blank instead.

Optionally, as shown in FIG. 9, the opposed panel, panel 144' may be modified from panel 144 and have a similar opening 144*g* to hold an electronic device 174 therein, such as a caregiver set of controls for the patient support apparatus. A second opening 144*h* may also be provided in panel 144' to hold a second electronic device 176, such as such as a light, including an alert light, microphone, speaker, or camera. Other suitable electronic devices that may be incorporated into panel 144' (or panel 144) are described in U.S. Pat. Nos. 7,784,125, 8,393,026, 10,791,966, and 10,980,689, and PCT Application Ser. No. PCT/US22/35359, filed on Jun. 28, 2022, which are commonly owned by Stryker Corp. of Kalamazoo, MI and which are incorporated by reference in their entireties herein.

Figure 5:
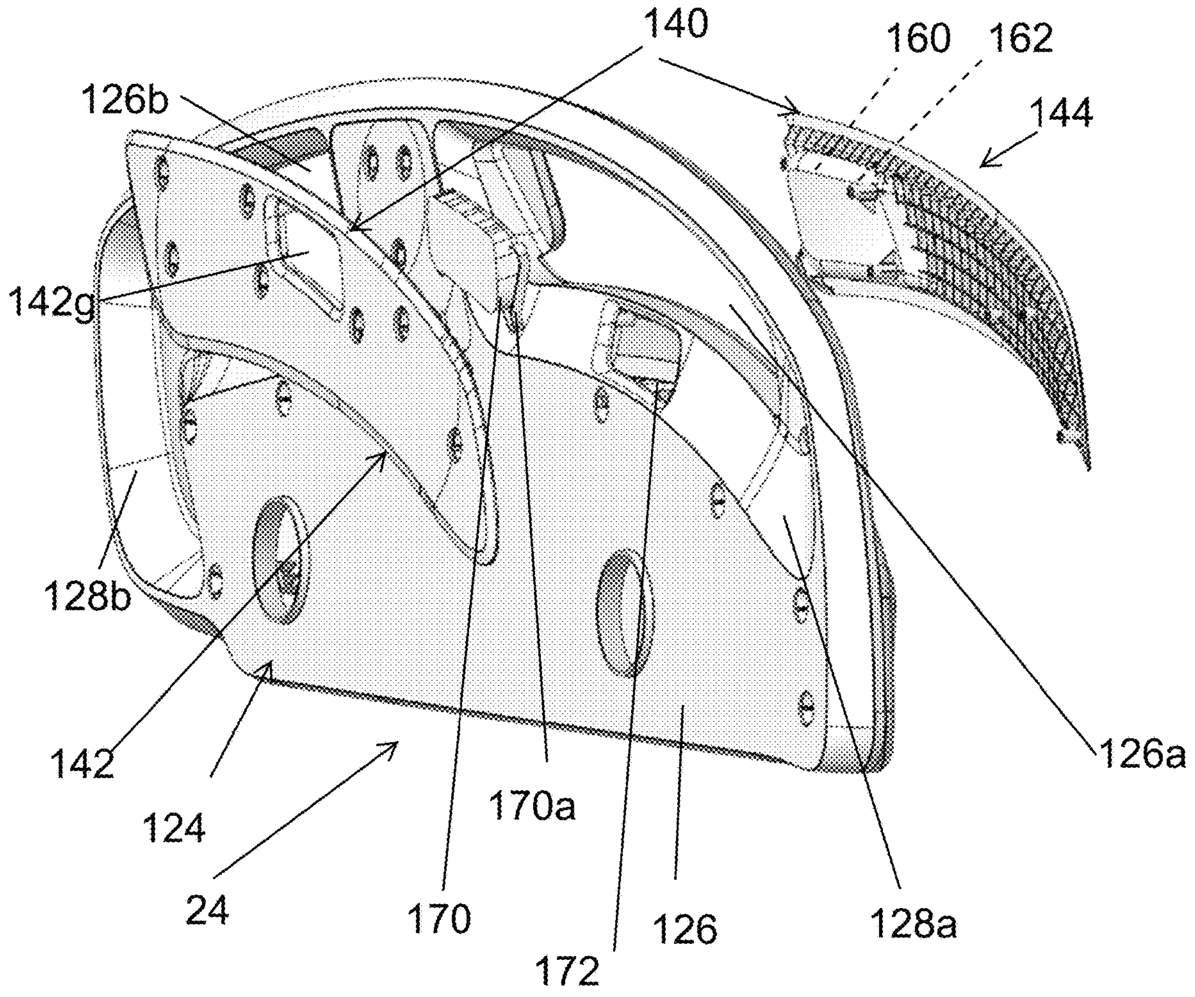
FIG. 5 is an exploded perspective view of another embodiment of the side rail.
Figure 7:
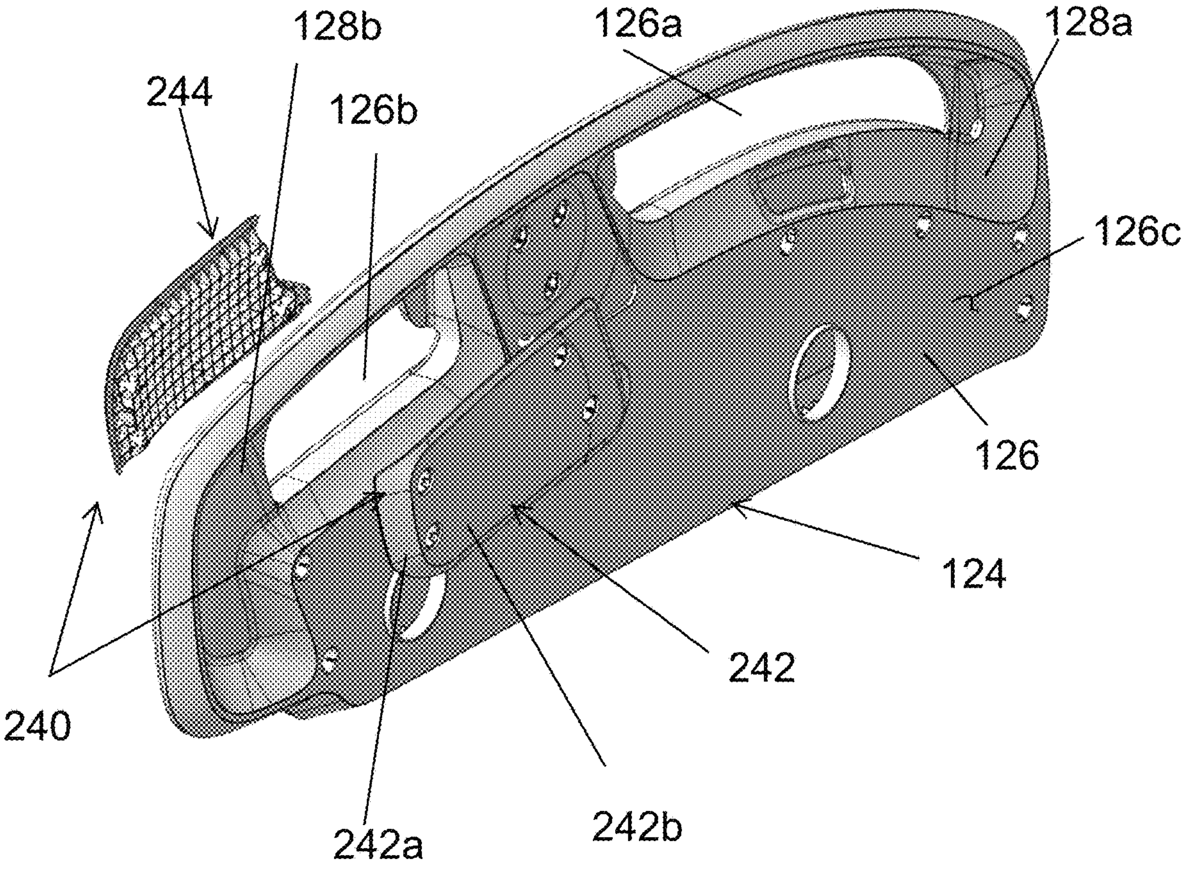
FIG. 7 is another exploded perspective view of the side rail of FIG. 5.

As best seen in FIG. 5, similar to opening 26*a*, openings 126*a* and 126*b* are located in recesses 128*a* and 128*b* formed in side rail body 126, respectively. As best seen in FIGS. 7, recess 128*a* has an outermost perimeter at the juncture with outer surface 126*c* of side rail body 126 from which through opening 126*a* is offset by a varying amount—similar to opening 26*a* in recess 28—and which is covered and closed by panel 142 in a similar manner as described above.

Similar to the previous embodiment, panel 144 may include a recess 160 formed in its outwardly facing side to form a second handhold 162 on the outwardly facing side of side rail 24, similar to recess 60.

As best seen in FIG. 7, recess 128*b* has a rotated L-shaped configuration with opening 126*b* located in the generally horizontal leg of recess 128*b*. In contrast to the other panels, panel 242 may be configured to only partially cover recess 128*b* (though fully cover opening 126*b*) leaving a portion uncovered and allowing recess 128*b* to retain a portion of the handhold previously formed by the through opening 126*b* and recess 128*b*, though only on the patient facing side of side rail 24. To that end, panel 242 may have a flange 242*a* that closes the gap between the patient facing side 242*b* of panel 242 and is shaped so that it generally follows the surface topography of recess 128*b* adjacent opening 126*b*. Flange 242*a* may extend from and around one edge of panel 242 or may extend from and along more than one edge, depending whether panel 242 extends across the full vertical height (along the horizontal leg) of the recess 128*b* and also on the shape of panel 242.

In this manner the vertical leg of recess 128*b* is left open and available as a grabbing surface and, thereby, available to form a handhold on the patient facing side of foot end side rail 124.

Panel 244 may or may not have a recess similar to recess 60 or 160 and may be sized to completely cover and fill the recess on the outwardly facing side of the foot end side rail 124.

Optionally, the extended portions of recess 128*a*, 128*b* may be used as a storage space either accessible through the panel or adjacent the panel, for example, as shown in reference to panel 242. The storage space may be covered with a separate panel that is mounted over the extended portion of the recess adjacent or in the respective panel, for example, by fasteners that either engage the side rail body or the panel.

Figure 11:
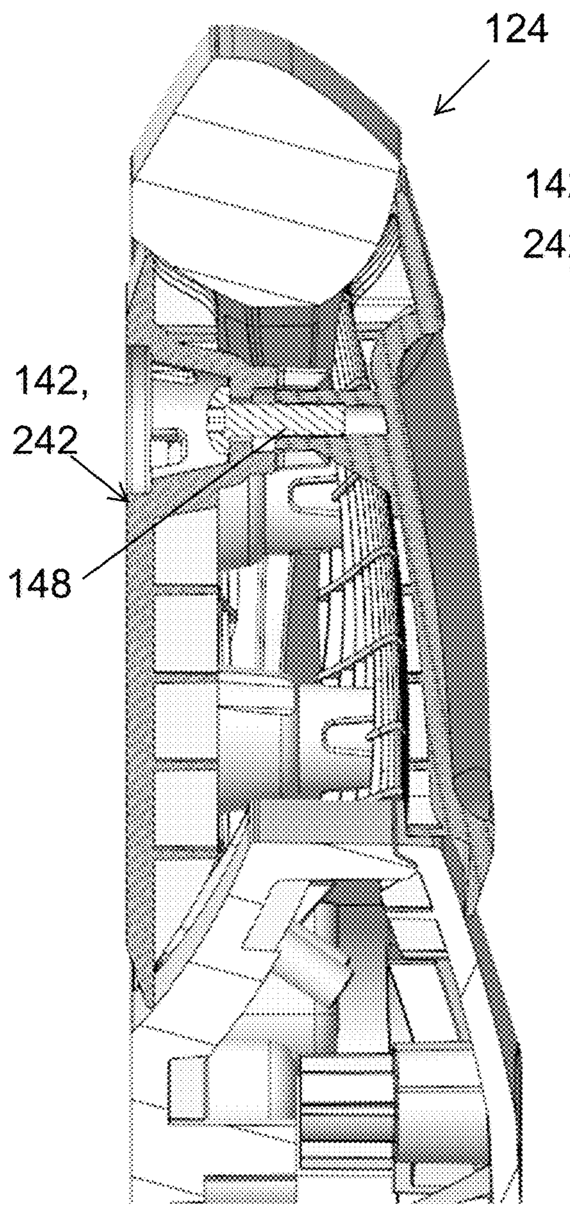
FIG. 11 is an enlarged cross-section view of the side rail of FIG. 8.

Referring to FIGS. 11 and 12, in a similar manner to panels 42 and 44, panels 142, 144 (and 144') and 242 and 244 are joined together without engaging the side rail body. They can be joined by fasteners 148, such as threaded fasteners (FIG. 11) or snap fit couplers, such as cantilever type couplers (FIG. 12).

For further details, including alternate details, of the construction of the panels and their mounting arrangement options, reference is made to the first embodiment. As noted above, one or both sets of panels may be replaced with a single panel that spans the two through openings.

It will be understood by those skilled in the art that patient support apparatus 10 can be designed with other types of mechanical constructions, such as, but not limited to, that described in commonly assigned, U.S. Pat. No. 10,130,536 to Roussy et al., entitled PATIENT SUPPORT USABLE WITH BARIATRIC PATIENTS, the complete disclosure of which is incorporated herein by reference. In another embodiment, the mechanical construction of patient support apparatus 10 may be the same as, or nearly the same as, the mechanical construction of the Model 3002 S3 bed manufactured and sold by Stryker Corporation of Kalamazoo, Michigan. This mechanical construction is described in greater detail in the Stryker Maintenance Manual for the MedSurg Bed, Model 3002 S3, published in 2010 by Stryker Corporation of Kalamazoo, Michigan, the complete disclosure of which is incorporated herein by reference. It will be understood by those skilled in the art that patient support apparatus 10 can be designed with still other types of mechanical constructions, such as, but not limited to, those described in commonly assigned, U.S. Pat. No. 7,690,059 issued to Lemire et al., and entitled HOSPITAL BED; and/or commonly assigned U.S. Pat. publication No. 2007/0163045 filed by Becker et al., and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of patient support apparatus 10 may also take on still other forms different from what is disclosed in the aforementioned references.

The patient support apparatus 10 may also incorporate a bed exit detection function that is adapted to issue an alert when a patient exits from patient support apparatus 10. Such an exit detection function may include any of the same features and/or functions as, and/or may be constructed in any of the same manners as, the exit detection systems disclosed in commonly assigned U.S. patent application 62/889,254 filed Aug. 20, 2019, by inventors Sujay Sukumaran et al., and entitled PERSON SUPPORT APPARATUS WITH ADJUSTABLE EXIT DETECTION ZONES; U.S. patent application Ser. No. 17/318,476 filed May 12, 2021, by inventors Sujay Sukumaran et al., and entitled PATIENT SUPPORT APPARATUS WITH AUTOMATIC EXIT DETECTION MODES OF OPERATION; and/or the exit detection system disclosed in commonly assigned U.S. Pat. No. 5,276,432 issued to Travis and entitled PATIENT EXIT DETECTION MECHANISM FOR HOSPITAL BED, the complete disclosures of all of which are incorporated herein by reference in their entireties.

Further details of one type of monitoring system that may be built into patient support apparatus 10 are disclosed in commonly assigned U.S. patent application Ser. No. 62/864,638 filed Jun. 21, 2019, by inventors Kurosh Nahavandi et al., and entitled PATIENT SUPPORT APPARATUS WITH CAREGIVER REMINDERS, as well as commonly assigned U.S. patent application Ser. No. 16/721,133 filed Dec. 19, 2019, by inventors Kurosh Nahavandi et al., and entitled PATIENT SUPPORT APPARATUSES WITH MOTION CUSTOMIZATION, the complete disclosures of both of which are incorporated herein by reference in their entireties. Other types of monitoring systems may be included within patient support apparatus 10 for monitoring parameters of the patient support apparatus 10.

In some embodiments, patient support apparatus 10 may incorporate a scale system that may include any of the same features, components, and/or functions as the scale systems disclosed in the following commonly assigned patent references: U.S. patent application Ser. No. 62/889,254 filed Aug. 20, 2019, by inventors Sujay Sukumaran et al. and entitled PERSON SUPPORT APPARATUS WITH ADJUSTABLE EXIT DETECTION ZONES; U.S. patent application Ser. No. 63/255,211 filed Oct. 13, 2021, by inventors Sujay Sukumaran et al., and entitled PATIENT SUPPORT APPARATUS WITH AUTOMATIC SCALE FUNCTIONALITY; U.S. Pat. No. 10,357,185 issued to Marko Kostic et al. on Jul. 23, 2019, and entitled PERSON SUPPORT APPARATUSES WITH MOTION MONITORING; U.S. patent 11,33,233 issued to Michael Hayes et al. on Jun. 15, 2021, and entitled PATIENT SUPPORT APPARATUS WITH PATIENT INFORMATION SENSORS; U.S. patent application Ser. No. 16/992,515 filed Aug. 13, 2020, by inventors Kurosh Nahavandi et al. and entitled PATIENT SUPPORT APPARATUS WITH EQUIPMENT WEIGHT LOG; and U.S. patent application Ser. No. 63/255,223, filed Oct. 13, 2021, by inventors Sujay Sukumaran et al., and entitled PATIENT SUPPORT APPARATUS WITH PATIENT WEIGHT MONITORING, the complete disclosures of all of which are incorporated herein by reference in their entireties. The scale system may utilize the same force sensors that are utilized by the exit detection system, in some embodiments, or it may utilize one or more different sensors.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

The invention claimed is:

1. A patient support apparatus comprising:

a deck for supporting a mattress thereon;

a barrier mounted relative to said deck, said barrier having a barrier body, said barrier body having opposed first and second outer sides, a barrier outer perimeter, and a through opening extending there through from said first outer side to said second outer side;

a cover for covering said through opening and being mounted at said barrier body, said cover including a first panel and a second panel, said first panel having an outer surface forming a patient facing surface and having a first panel outer perimeter, said second panel having a second panel outer perimeter and an outer surface forming an outwardly facing surface of said barrier when mounted to said barrier body, and said first panel and said second panel being joined together by a fastener, wherein said fastener does not engage said barrier body; and said first panel including a first flexible lip that defines a first outermost flexible perimeter edge of said first outer perimeter of said first panel, said second panel including a second flexible lip that defines a second outermost flexible perimeter edge of said second panel outer perimeter of said second panel, said first and second flexible lips being configured such that said first and second outermost flexible perimeter edges engage opposed sides of said barrier body adjacent said through opening.

2. The patient support apparatus according to claim 1, wherein said first panel and said second panel are joined together by said fastener inward of said first and second panel outer perimeters.

3. The patient support apparatus according to claim 1, wherein said patient facing surface of said first panel comprises an imperforate surface.

4. The patient support apparatus according to claim 1, wherein said fastener comprises a threaded fastener or a snap fit coupler.

5. The patient support apparatus according to claim 1, wherein said second panel includes a recess in said outwardly facing surface to form a handhold.

6. A patient support apparatus comprising:

a deck for supporting a mattress thereon;

a barrier mounted relative to said deck, said barrier having a barrier body, said barrier body having opposed first and second outer sides, a barrier outer perimeter, and a through opening extending there through from said first outer side to said second outer side, wherein said barrier body includes a mounting location configured to receive an electronic device;

a removable cover for covering said through opening and being mounted at said barrier body, said cover including a first panel and a second panel, said first panel having an outer surface forming a patient facing surface and having a first panel outer perimeter, said second panel having a second panel outer perimeter and an outer surface forming an outwardly facing surface of said barrier when mounted to said barrier body, and said first panel and said second panel being joined together by a fastener, wherein said fastener does not engage said barrier body; and wherein said second panel includes an opening sized to receive and support an electronic device therein, wherein said removable cover is configured to cover the mounting location of the barrier body configured to receive the electronic device, such that the electronic device is instead supported by the second panel, wherein a space is provided between the first and second panels and corresponds at least in part to a region associated with the through opening, and wherein cabling for the electronic device is routable in the space between the first and second panels toward the mounting location of the barrier body previously configured to receive the electronic device.

7. The patient support apparatus according to claim 6, further comprising an electronic device supported in said opening of said second panel.

8. The patient support apparatus according to claim 1, wherein at least a portion of each of said first and second panels is transparent.

9. The patient support apparatus according to claim 1, further comprising a light source directing light into at least one of said panels.

10. The patient support apparatus according to claim 1, wherein said first panel comprises a monolithic panel.

11. The patient support apparatus according to claim 10, wherein said flexible lip of said first panel is molded with said monolithic panel for engaging said barrier body adjacent said through opening.

12. The patient support apparatus according to claim 1, wherein said flexible lip is mounted to said cover.

13. The patient support apparatus according to claim 1, wherein said first and second sides of said barrier body each include a recess, and wherein said through opening is located in said recesses.

14. The patient support apparatus according to claim 13, at least one panel of said first and second panels is mounted to said barrier body in one of said recesses over said through opening, wherein said one panel is recessed in said barrier body.

15. The patient support apparatus of claim 1, wherein said first panel and said second panel are joined together by a fastener, wherein said fastener does not engage said barrier body, and wherein said first panel on the patient side of said barrier body is flush mounted to said barrier body.

16. The patient support apparatus according to claim 1, wherein said first and second panels are releasably mounted to said barrier body, and wherein said first and second panels are removable.

17. The patient support apparatus according to claim 1, wherein said through opening comprises a first through opening, said barrier body including a second through opening, at least one of said first and second panels covering said first and second through openings.

18. The patient support apparatus according to claim 1, wherein said barrier comprises a side rail.

* * * * *